United States Patent [19]
Nishino et al.

[11] Patent Number: 5,709,291
[45] Date of Patent: Jan. 20, 1998

[54] DEVICE FOR CONTACTLESS POWER SUPPLY TO MOVING BODY

[75] Inventors: Shuzo Nishino; Michio Iwama; Tomomi Imanaka, all of Osaka, Japan

[73] Assignee: Daifuku Co., Ltd., Osaka, Japan

[21] Appl. No.: 335,867

[22] PCT Filed: May 19, 1993

[86] PCT No.: PCT/JP93/00676

§ 371 Date: May 28, 1996

§ 102(e) Date: May 28, 1996

[87] PCT Pub. No.: WO93/24343

PCT Pub. Date: Dec. 9, 1993

[30] Foreign Application Priority Data

| May 22, 1992 | [JP] | Japan | 4/129178 |
| Jun. 11, 1992 | [JP] | Japan | 4/151781 |

[51] Int. Cl.$^6$ ................................................ B60L 5/00
[52] U.S. Cl. ................................................ 191/10
[58] Field of Search ............... 191/2, 3, 4, 5, 191/6, 7, 10, 14–21; 246/187 R, 187 A, 187 B; 320/2, 21

[56] References Cited

U.S. PATENT DOCUMENTS

| 2,082,281 | 6/1937 | Frank | 191/23 R |
| 3,002,059 | 9/1961 | Mageoch | 191/6 |
| 3,772,482 | 11/1973 | Ross, Jr. | 191/23 R |
| 5,293,308 | 3/1994 | Boys et al. | 363/37 |
| 5,467,718 | 11/1995 | Shibata et al. | 191/10 X |
| 5,551,350 | 9/1996 | Yamada et al. | 191/10 X |

FOREIGN PATENT DOCUMENTS

| 4115568 | 2/1993 | Germany | 191/10 |
| 52-27445 | 6/1977 | Japan . | |
| 63-73802 | 4/1988 | Japan . | |
| 1180101 | 12/1989 | Japan . | |
| 5-344602 | 12/1993 | Japan | 191/10 |
| 6-54403 | 2/1994 | Japan | 191/10 |
| 854767 | 8/1981 | U.S.S.R. | 191/10 |
| 988597 | 1/1983 | U.S.S.R. | 191/10 |

*Primary Examiner*—Mark T. Le
*Attorney, Agent, or Firm*—Barnes, Kisselle, Raisch, Choate, Whittemore & Hulbert, P.C.

[57] ABSTRACT

A device for contactlessly supplying power to a moving body (2) such as a pallet being transported in a predetermined transport passage and carrying a device to be supplied with power while supplying power to the last-mentioned device. An induction wire (14) is laid along the transport passage (1) and a high frequency sine wave current is passed through the induction wire (14). The moving body (2) is provided with a coil (16) in which an electromotive force is produced by the action of the magnetic flux produced by the induction wire (14), a capacitor (31) cooperating with the coil (16) to form a resonance circuit adapted to resonate at the frequency of the current flowing through the induction wire (14), and a power switch circuit connected to the resonance circuit and supply power to the device to be supplied with power.

10 Claims, 13 Drawing Sheets

DEVICE FOR CONTACTLESS POWER SUPPLY TO MOVING BODY

FIELD OF INVENTION

The present invention relates to a device for contactlessly supplying power to a moving body, such as a pallet, carrying a device to receive power and being transported in a predetermined transport passage.

BACKGROUND OF THE INVENTION

This type of known device comprises a current collecting plate disposed on the lower surface of a pallet transported by a conveyor, such as a chain conveyor, a swingable current collector or power supplying roller disposed on the conveyor, said current collector or power supplying roller being connected to a power source wiring and contacted with the current collecting plate on the pallet. This contact forms a power supplying passage to the pallet to effect power supply to a device to receive power placed on the pallet.

However, in such known power supplying device, the current collecting plate on the pallet and the current collector on the conveyor rub each other and thereby wear, thus making maintenance indispensable. Another problem is that dust is produced during wearing. Further, since the current collector or power supplying roller on the conveyor is left exposed, there is a danger of being struck by electricity. Further, sparks are produced in the sliding parts, a fact which means that the device cannot be used in areas where explosion should be prevented.

Accordingly, Japanese Patent Application Disclosure No. 63-73802 proposes a contactless power supplying device comprising a power supplying line laid along a transport passage for a moving stand and a power transmission section disposed on one side of the moving stand for magnetic coupling with said power supplying wire.

In such power supply based on magnetic coupling, however, unless the distance between the power supplying wire and the power transmission section is kept constant, power supplying efficiency lowers, making it impossible to attain a stabilized power supply.

Accordingly, Japanese Utility Model Application Disclosure No. 1-180101 proposes an arrangement wherein a mechanism for keeping constant the distance between the power supplying line and the power transmission section is installed in the power transmission section.

However, such mechanical mechanism complicates the device, resulting in an increased cost and need for maintenance.

SUMMARY OF THE INVENTION

The present invention has solved the above problems. One object of the invention is to provide a contactless power supplying device which eliminates the need for maintenance and is to contactlessly and efficiently supplies power to a moving body such as a pallet being transported.

To achieve this object, the device for contactlessly supplying power to a moving body being transported in a predetermined transport passage and having mounted thereon a device to receive power while supplying power to the last-mentioned device, comprises an induction wire which is laid along said transport passage and through which a high frequency sine wave current is passed, a coil installed in said moving body and subjected to the magnetic flux from said induction wire to produce an electromotive force, a capacitor installed in said moving body and cooperating with said coil to form a resonance circuit adapted to resonate at the frequency of the current flowing through said induction wire, and a power source circuit installed in said moving body and connected to said resonance circuit to supply power to said device to receive power.

According to such arrangement, an ac current is passed through the induction wire and the secondary side of the coil forms a resonance circuit, and hence a high voltage is produced in the secondary side; therefore, even if the distance between the induction wire and the coil varies or the frequency in the induction wire more or less fluctuates or the resonance frequency for the secondary side more or less fluctuates, a secondary side voltage having not less than a predetermined value is generated, and hence a high power can be contactlessly supplied stably to a device to to receive power. Further, the secondary side has no mechanical mechanism, so that using a simple circuit, the present device can be constructed at low cost. Such contactless supply of power means that there is no worry about the occurrence of wear in the current collecting plate installed in the moving body or the current collector or the power supplying roller installed in the conveyor, thus realizing a maintenance-free operation. Further, since the current flowing through the induction wire is sinusoidal, no high frequency waves are produced and hence the occurrence of radio noise can be eliminated.

BRIEF DESCRIPTION OF DRAWINGS

FIG. 18 is a front view of the principal portion of a sixth embodiment of the invention.

DESCRIPTION OF EMBODIMENTS

Figure 1:
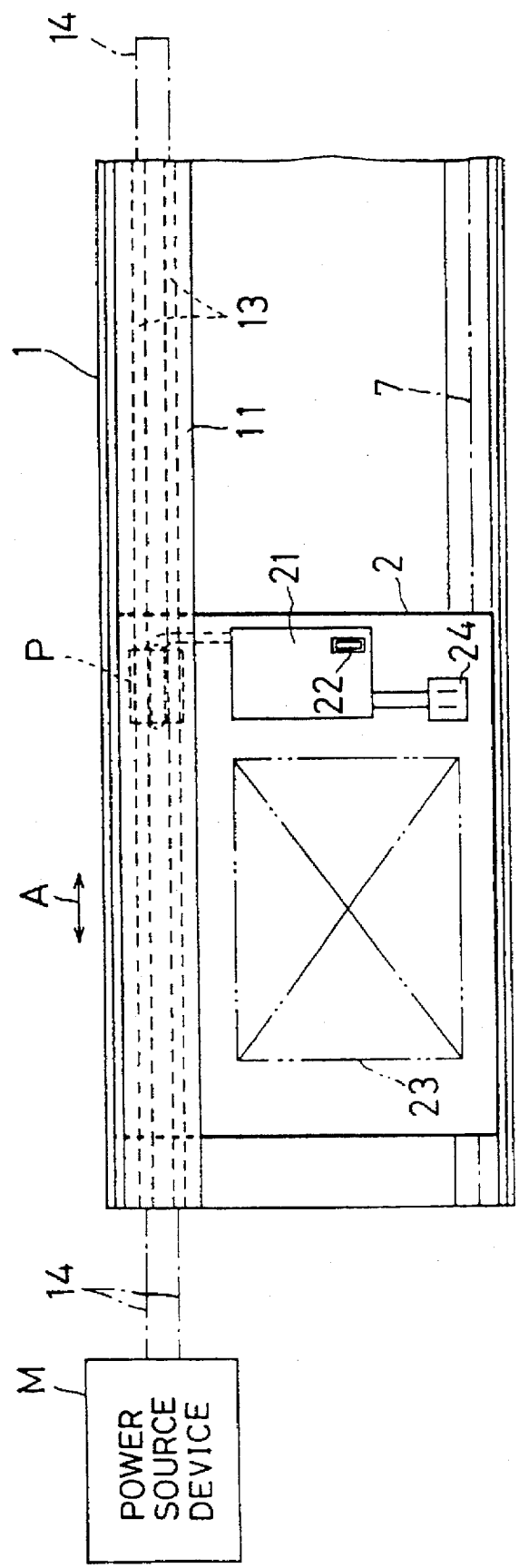
FIG. 1 is a plan view of the principal portion of a device for contactless supply of power to a moving body according to a first embodiment of the present invention.
Figure 2:
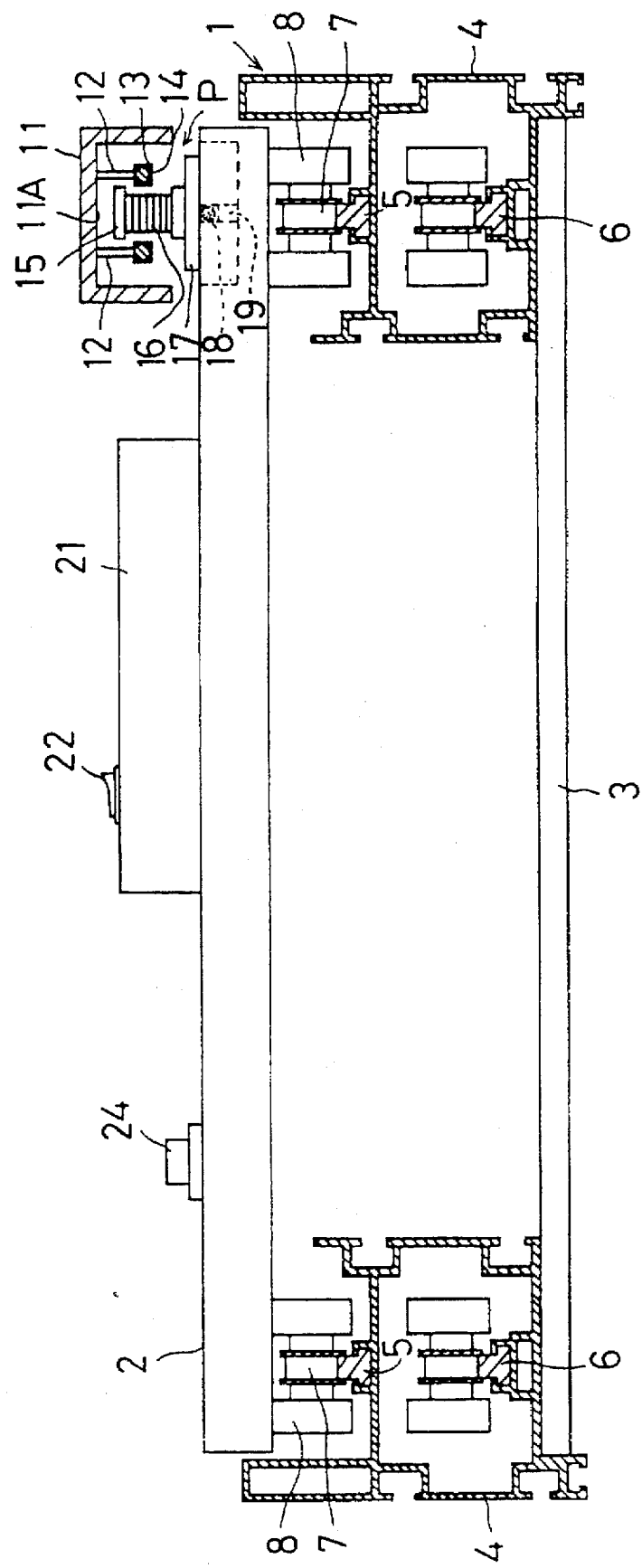
FIG. 2 is a plan view of the principal portion of said power supplying device.

FIGS. 1 through 6 show a first embodiment of the present invention.

The numeral 1 denotes a conveyor forming a transport passage for a pallet 2, said conveyor 1 having a pair of holder frames 4 interconnected at their bottom surfaces by a plurality of support members 3 disposed at predetermined intervals along the horizontal transport passage, i.e., in the transport direction A of the pallet 2. Each holder frame 4 has a transport rail 5 laid on top thereof and a return rail 6 laid in the lower region thereof. An endless chain 7 supported and guided by rails 5 and 6 has a number of free rollers 8 attached thereto, said free rollers supporting and transporting the pallet 2. The pallet carries a device to receive power and is capable of supplying power to this device.

A bracket 11 approximately U-shaped in cross section and formed of an aluminum member, which is a magnetic fieldshielding member, is disposed in opposed relation to the conveyor 1. This bracket 11 is suspended from the ceiling or from a support member (not shown) with its concave portion 11A directed downward. Suspended in the concave portion 11A of the bracket 11 are pairs of hangers 12 which are disposed at predetermined intervals in the transport direction A of the pallet 2, the two hangers in each pair being spaced in a transverse direction (in a direction at right angles with the transport direction A of the pallet 2). A pair of ducts 13 made of resin are held at the front ends of the hangers 12. An induction wire 14 is laid in the ducts 13, said induction wire 14 being in loop form with its initial and terminal ends connected to a power source device M; thus, in the concave portion 11A of the bracket 11, it is arranged in the form of a pair of induction wires which differ in the direction of passage of current flowing therethrough. The induction wire 14 is in the form of a twisted wire composed of thin insulated strands (hereinafter referred to as the litz wire) and covered with an insulating material, e.g., a resin material.

Figure 3A:
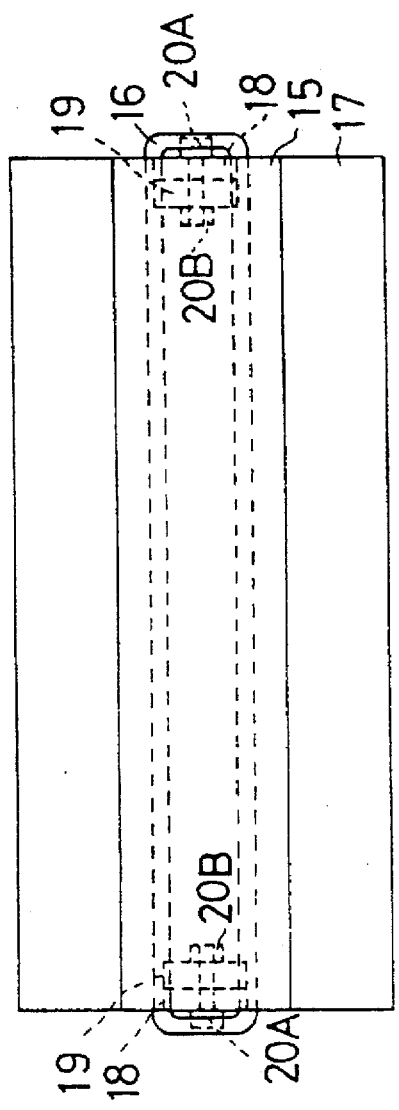
FIG. 3A through 3C are detailed views of a pick-up coil in said power supplying device.
Figure 3B:
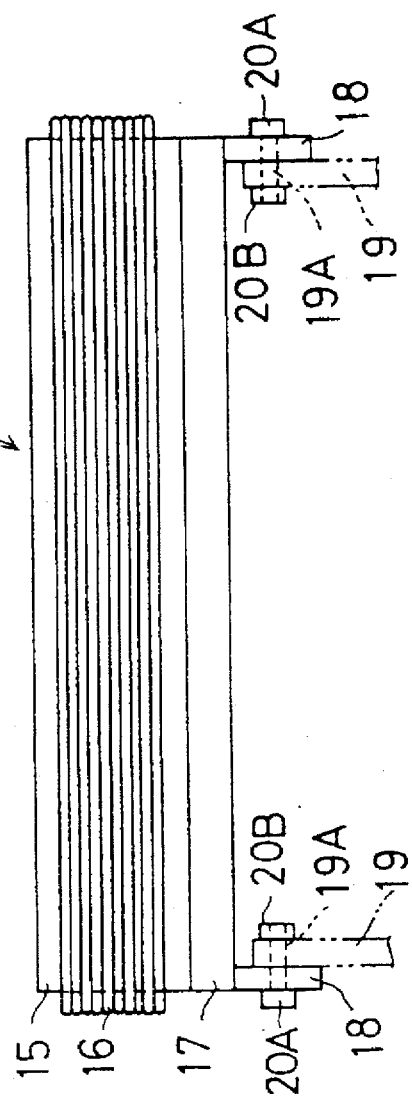
Figure 3C:
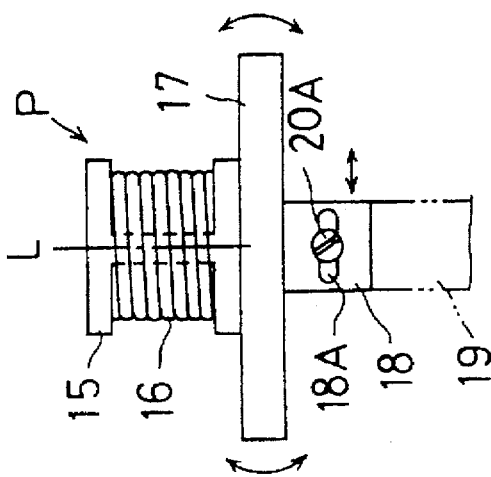

A pick-up unit P serving as a power supplying device is installed on the upper surface of the pallet 2 opposed to the bracket 11 having the induction wire 14 laid therein. The pick-up unit P, as shown in FIGS. 3A through 3C, has a ferrite core 15, which is a magnetic member, H-shaped in cross section and extending in the horizontal transport direction A. A litz wire is wound 10–20 turns around the web of the H-shaped ferrite core 15, so as to form a pick-up coil 16. A ferrite plate 17 is attached to the bottom of the ferrite core 15 associated with the pallet 2, and plate-like attaching members 18 are attached to the opposite ends of the ferrite plate 17 as seen in the direction of the length of the ferrite core 15 so that they are directed vertically downward.

Each attaching member 18, as shown in FIG. 3C, is formed with an elongated opening 18A whose opposite ends are semicircular. These attaching members 18 are connected to a pair of support members 19 by bolts 20A extending through their respective openings 18A and 19A, said support members 19 being fixed to the pallet 2. More particularly, the position of the pick-up unit P is adjusted by being turned and horizontally moved as indicated by arrows in FIG. 3C so that the center L of the ferrite core 15 of the pick-up unit P is perpendicular to the bracket 11 at a position approximately intermediate between the pair of ducts 13 for the induction wire 14. And then the bolts 20A and nuts 20B are mutually tightened together, whereby the pick-up unit P is fixed to the pallet 2.

Installed on the upper surface of the pallet 2 is a power receiving unit 21 which uses as its power source the electromotive force generated in the pick-up coil 16. A power switch 22 is installed on the upper surface of the power receiving unit 21. Installed on the upper surface of the pallet 2 is a single phase receptacle 24 for supplying and ac current of commercial frequency from the power receiving unit 21 to a device 23 to receive power.

Figure 4:
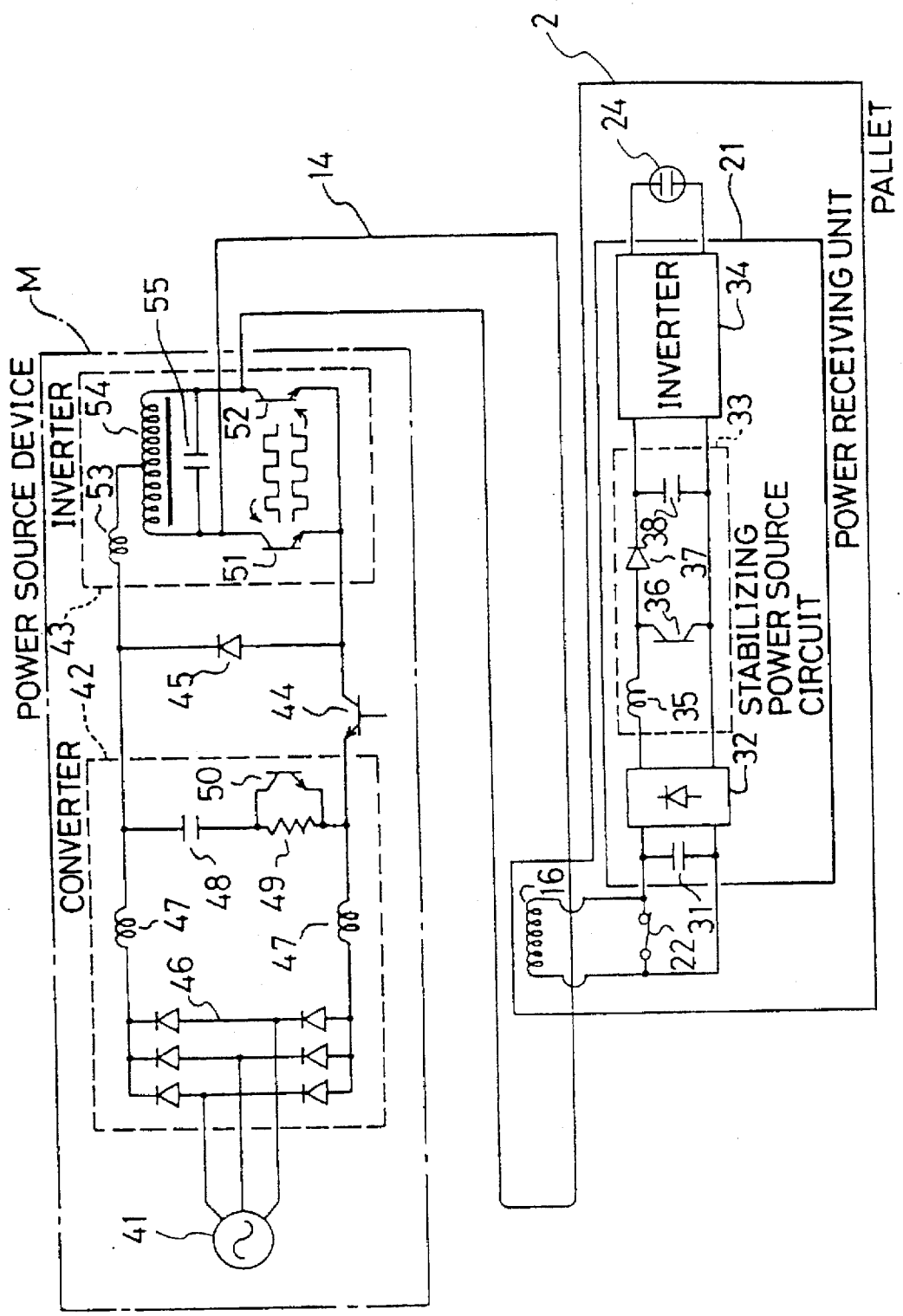
FIG. 4 is a circuit diagram of said power supplying device.

The circuit arrangement for the power source device M and the pallet 2 will now be described with reference to the circuit diagram of FIG. 4.

The power source device M comprises a 200 V, 3-phase ac power source 41, a converter 42, a sine wave resonance inverter 43, an overcurrent protection transistor 44, and a diode 48. The converter 42 has diodes 48 for full wave rectification. Further, the converter 42 has a filter which comprises a coil 47, a capacitor 48, a resistor and a transistor 50 which shorts said resistor 49. The sine wave resonance inverter 43 comprises transistors and 52 adapted to be driven by rectangular wave signals alternately produced as shown in the figures a current limiting coil 53, a current supplying coil 54 connected to the transistors 51 and 52, and a capacitor 55 cooperating with the induction wire 14 to form a parallel resonance circuit. The device for controlling the transistors is omitted from the illustration.

In the pallet 2, a parallel combination of the power switch 22 and power receiving unit 21 is connected to the pick-up coil 16. The power receiving unit 21 has a capacitor 31 cooperating with the pick-up coil 16 to form a resonance circuit which resonates at the frequency of the current flowing through the induction wire 14. Connected in parallel with said capacitor 31 of the resonance circuit is a rectifying diode 32 having connected thereto a stabilizing power source circuit 33 for controlling the output from said diode 32 to provide a predetermined dc voltage, said stabilizing power source circuit 33 having connected thereto an inverter 34 for converting the dc voltage into a predetermined ac voltage of commercial frequency. The receptacle 24 is connected to said inverter 34. The stabilizing power source circuit 33 comprises a current limiting coil 35, an output controlling transistor 36, a diode 37 and a capacitor 38, the last two components constituting a filter. The device for controlling the transistor is omitted from the illustration. When the power switch 22 is closed, the pick-up coil 16 is shorted.

The operation of the circuit arrangement comprising the power source device M, induction wire 14, pallet 2 will now be described.

The 200-V 3-phase ac current from the ac power source 41 is converted into ac current by the converter 42 and converted into a high frequency, e.g., a 10-kHz sine wave current by the sine wave inverter 43 and then supplied to the induction wire 14.

The device 23 to receive power is mounted on the pallet 2 and connected to the power receiving unit 21 through the receptacle 24. When the power switch 22 is opened, the magnetic flux produced in the induction wire produces an electromotive force in the pick-up coil 16 in the pallet 2 resonating at the frequency of the current flowing through the induction wire 14. The ac current produced by this electromotive force is rectified by the diode 32 of the power receiving unit 21, controlled by the stabilizing power source circuit 33 to provide a predetermined dc voltage of commercial frequency, and supplied to the device 23 through the receptacle 24. In this state, the pallet 2 is transported by the conveyor 1, while the device 23 being brought to an aging test, wherein aging means variation in electrical properties occurring in the passing of time.

Figure 5:
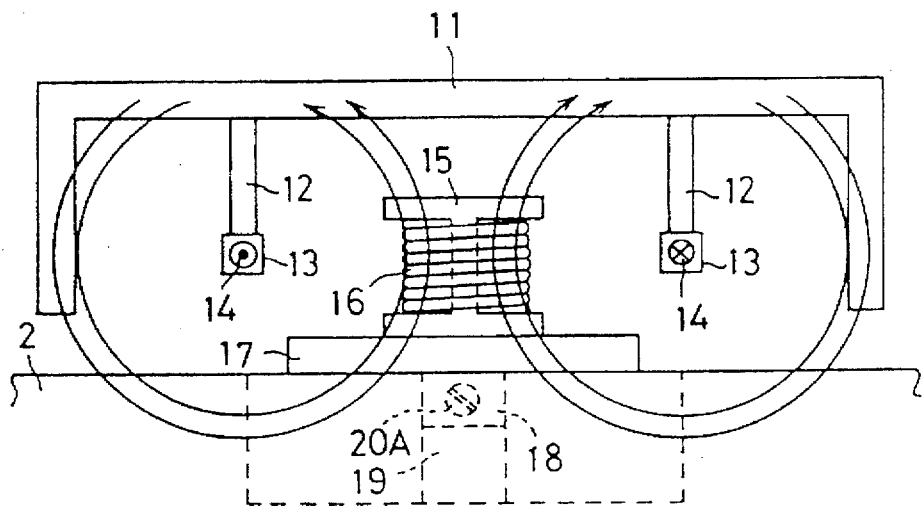
FIG. 5 is a schematic view for explaining an electromotive force produced in the pick-up coil of said power supplying device.

Since power can be supplied to the pallet 2 and to the device 23 without contact during transport in this manner, it is no longer necessary to worry about the wear of the current collecting plate installed on the lower surface of the pallet or the current collector or power supplying roller for the conveyor as in the prior art and hence maintenance-free operation can be realized. Further, power can be supplied without regard to the direction of transport of the pallet 2. The center L of the ferrite core 15 is adjusted to be positioned perpendicular to the bracket 11 at a position intermediate between the pair of ducts 13 having the induction wire 14 laid therein; therefore, as shown in FIG. 5, the pick-up coil 16 is positioned in a place where the density of magnetic flux produced by the induction wire 14 is at a maximum. As a result, a maximum electromotive force is produced and power can be efficiently fed. The magnetic field produced by the induction wire 14 is shielded by the bracket 11, which is a magnetic shielding member, so that the magnetic field is prevented from affecting the device 23 to receive power. Since the pick-up coil 16 is formed by the litz wire being wound around the web of the ferrite core of H-shaped cross section, the litz wire is held by the upper and lower flanges, making it easier to wind the litz wire, increasing the efficiency of winding operation. The flanges at the opposite ends have a high permeability and hence a magnetic passage is formed therein, making it possible to produce a higher electromotive force.

Figure 6:
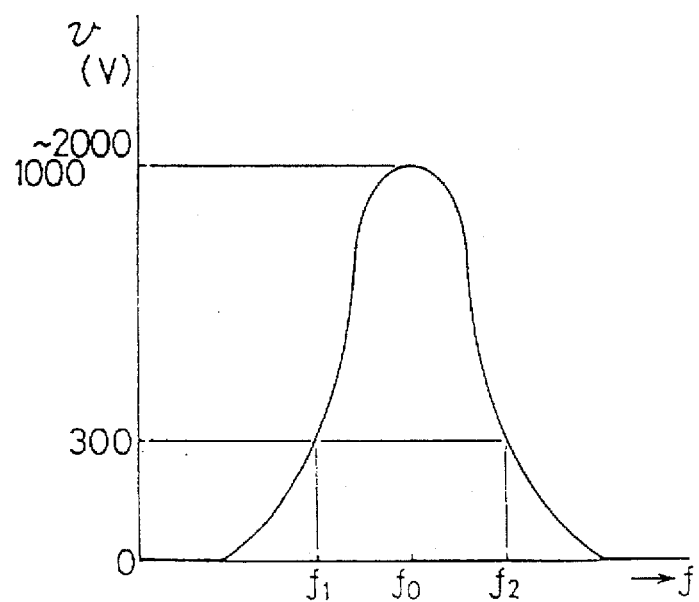
FIG. 6 is a characteristic curve showing the relation between the frequency on the secondary side and the electromotive force in said power supplying device.

Since the induction wire 14 is long as compared with the pick-up coil 16, the primary inductance of the induction wire 14 is approximately constant and since the capacitor 55 of the power source device M and the induction wire 14 constitute the resonance circuit, a primary current of high frequency sine wave having an approximately constant current value can be passed through the induction wire 14. Further, since the secondary side of the pick-up coil forms a resonance circuit, as shown in FIG. 6, at a resonance frequency $f_0$, there is produced in the secondary side a high voltage v (1,000–2,000 V, in the case of the figure). Therefore, even if the gap length between the induction wire 14 and the pick-up coil 16 varies, or the frequency in the induction wire 14 more or less varies, or the resonance frequency for the secondary side deviates from the frequency in the induction wire 14, it is possible to produce secondary voltages higher than a predetermined value (300 V in the case of the figure) in the frequency range between $f_1$ and $f_2$, so that higher power can be stably supplied. Therefore, the adjustment of the gap length can be roughly made and hence the operation is facilitated. Further, since there is no mechanical mechanism in the secondary side, the manufacture is facilitated to reduce the cost.

Since the litz wire covered with an insulating material is used for the induction wire 14 and pick-up coil 16, there is no electrically conductive portion left exposed. As a result, safety can be promoted. Further, the absence of sparks eliminates danger of fires and allows the present device to be used in areas where explosion should be prevented. Since the induction wire 14 is supplied with sine wave current, no high frequency waves are produced and hence the occurrence of radio noise can be eliminated.

Figure 7:
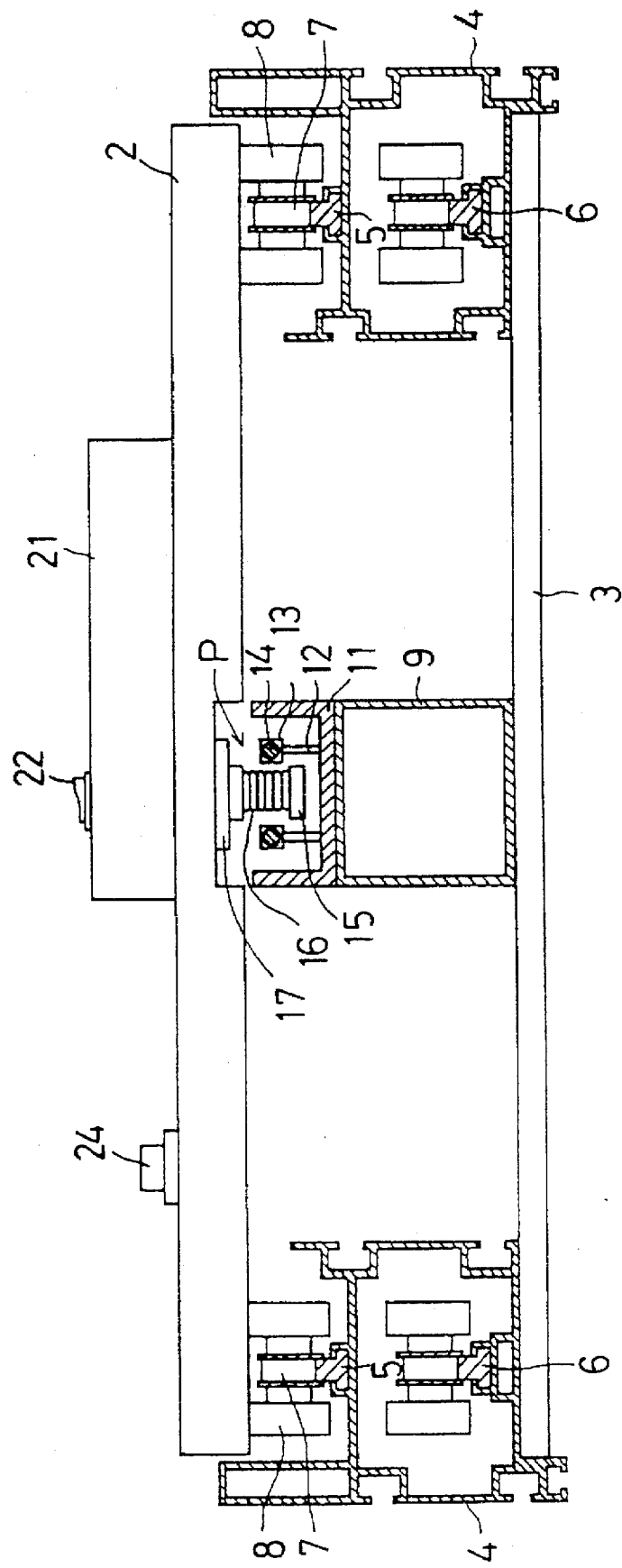
FIG. 7 is a front view of the principal portion of a power supplying device according to a second embodiment of the invention.

FIG. 7 shows a second embodiment of the present invention. Whereas in the first embodiment the induction wire 14 is installed above the pallet 2, in the second embodiment a bracket 11 is installed on the support member 3 of the conveyor 1 through a support member 9 with its concave portion 11A directed upward. With such arrangement also, similar effects can be attained. The pick-up unit P is attached to the lower surface of the pallet 2 in such a manner that the center of the ferrite core 15 of the pickup unit P is positioned approximately intermediate between the pair of ducts 13 and perpendicular to the bracket 11. Further, the bracket 11 may be disposed laterally of and outside the conveyor 1, in which case the pick-up unit P will be likewise attached to the lateral surface of the pallet 2.

In each of the above embodiments, a single-phase receptacle 24 is installed and a single-phase ac power source is supplied thereto, but a 3-phase receptacle may be installed together with an inverter for converting the output from the stabilizing power source circuit 23 into a 3-phase ac current, thus making it possible to supply a 3-phase ac power source. Further, it is also possible to directly supply a dc current from the stabilizing power source circuit 33. It is possible to supply a combination of a single-phase ac current, a 3-phase ac current and a dc current. In each of the above embodiments, the pallet 2 is provided with the power switch 22; however, a switch adapted to be opened when the power plug of the device 23 is inserted in the receptacle and closed when the power plug is extracted may be installed in the receptacle 24, said switch being connected in parallel with the pick-up coil 16, thus replacing the power switch 22.

In each of the above embodiments, the adjustment of the attached position of the pick-up unit P is allowed by the construction of the opening 11A of the attaching member 18. However, the invention is not limited to such construction and any other construction may be used provided that it allows the adjustment of the attached position of the pickup unit P. Although the conveyor 1 using the chain 7 for transporting the pallet 2 is employed, other means for forming the transport passage may be used.

Figure 8:
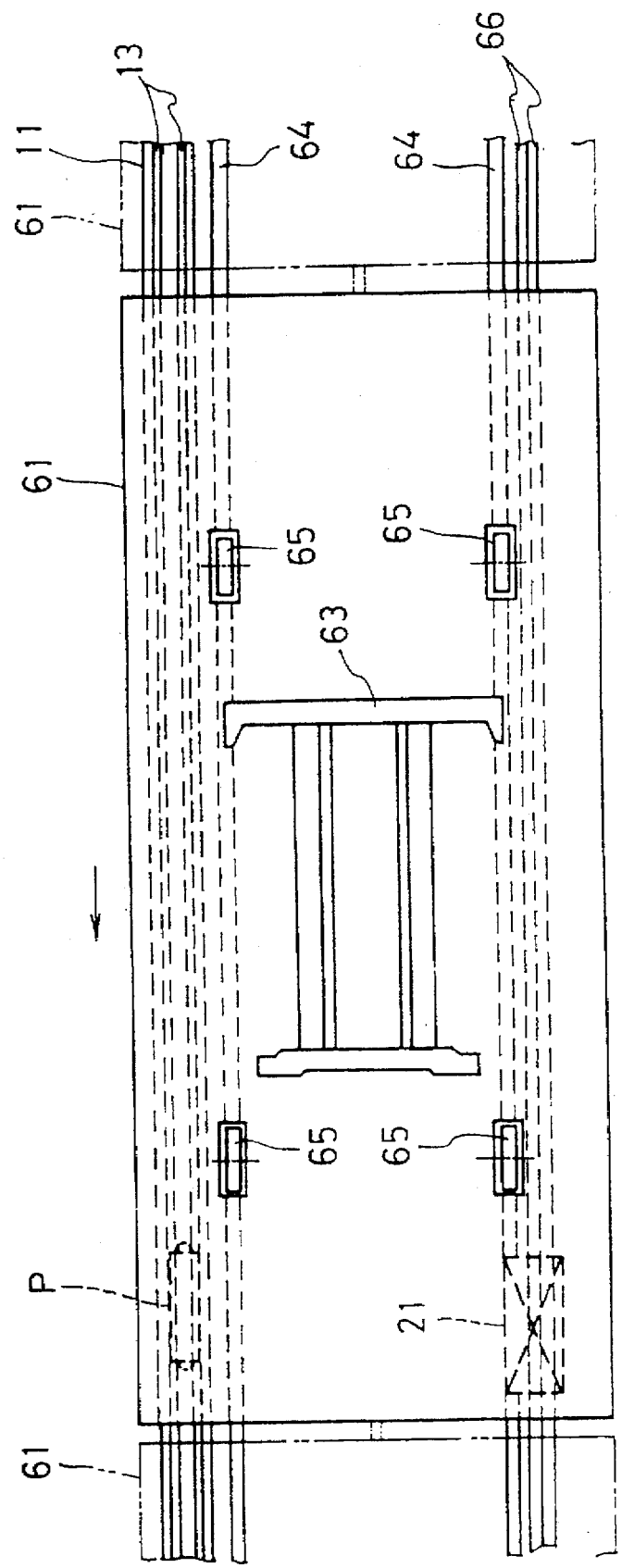
FIG. 8 is a front view of the principal portion of a power supplying device according to a third embodiment of the invention.
Figure 9:
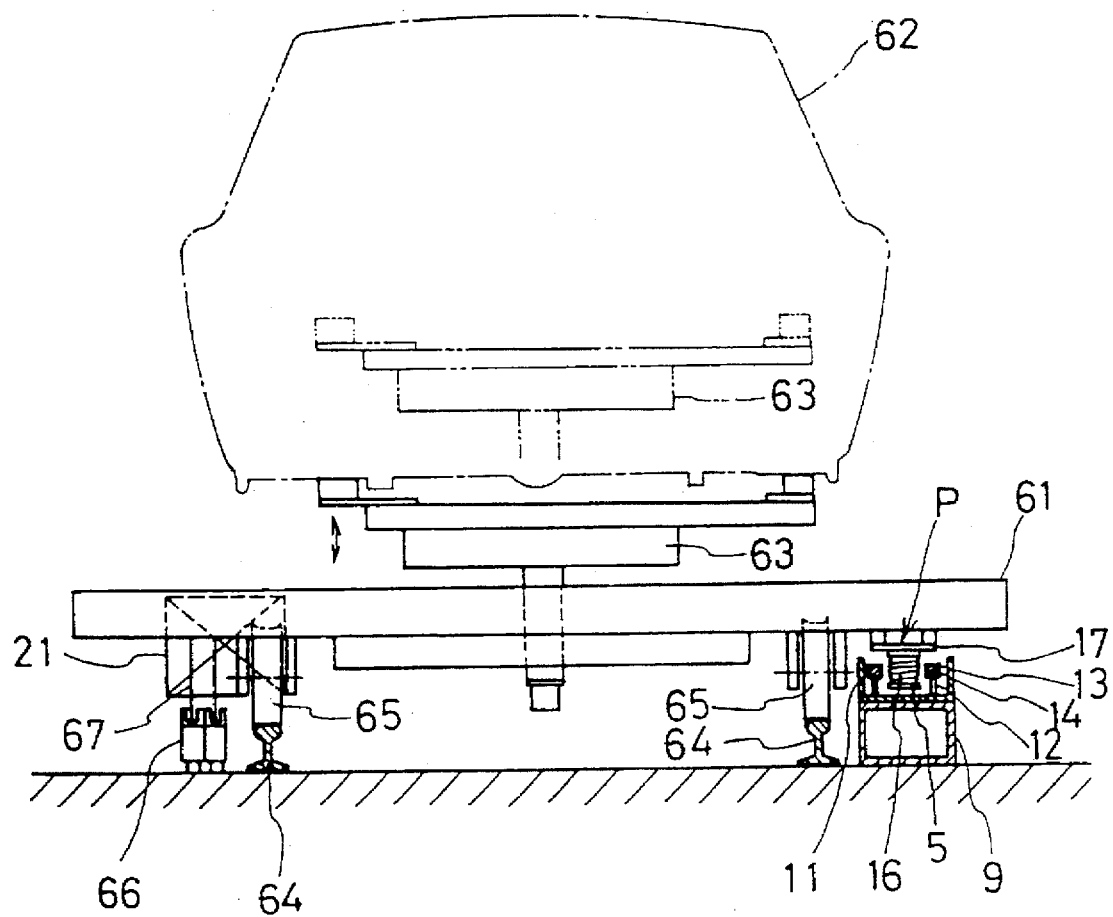
FIG. 9 is a front view of the portion shown in FIG. 8.
Figure 10:
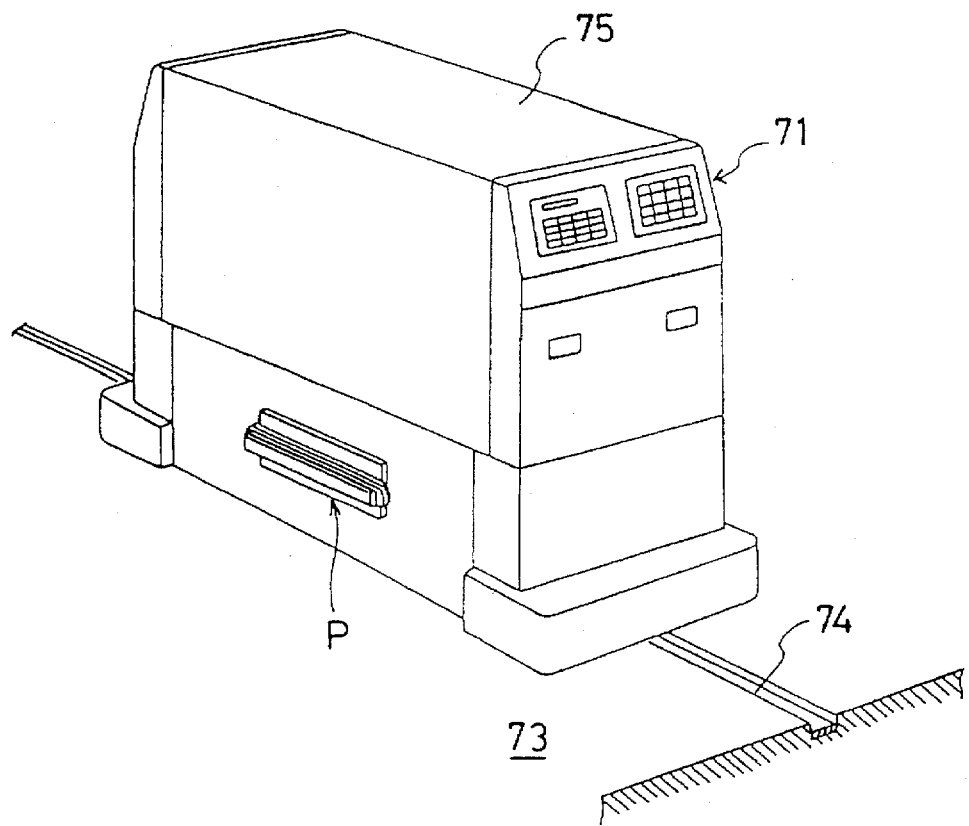
FIG. 10 is a perspective view of the principal portion of a device for contactless supply of power to a moving body in a fourth embodiment of the present invention.
Figure 11:
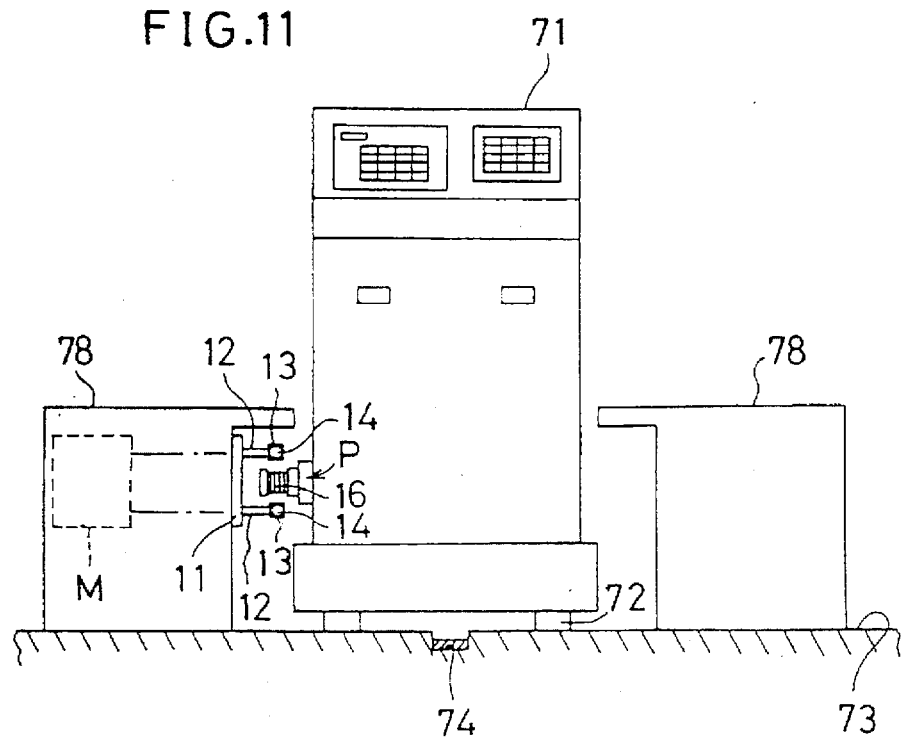
FIG. 11 is a front view of the position of a work station in the device of FIG. 10.
Figure 12:
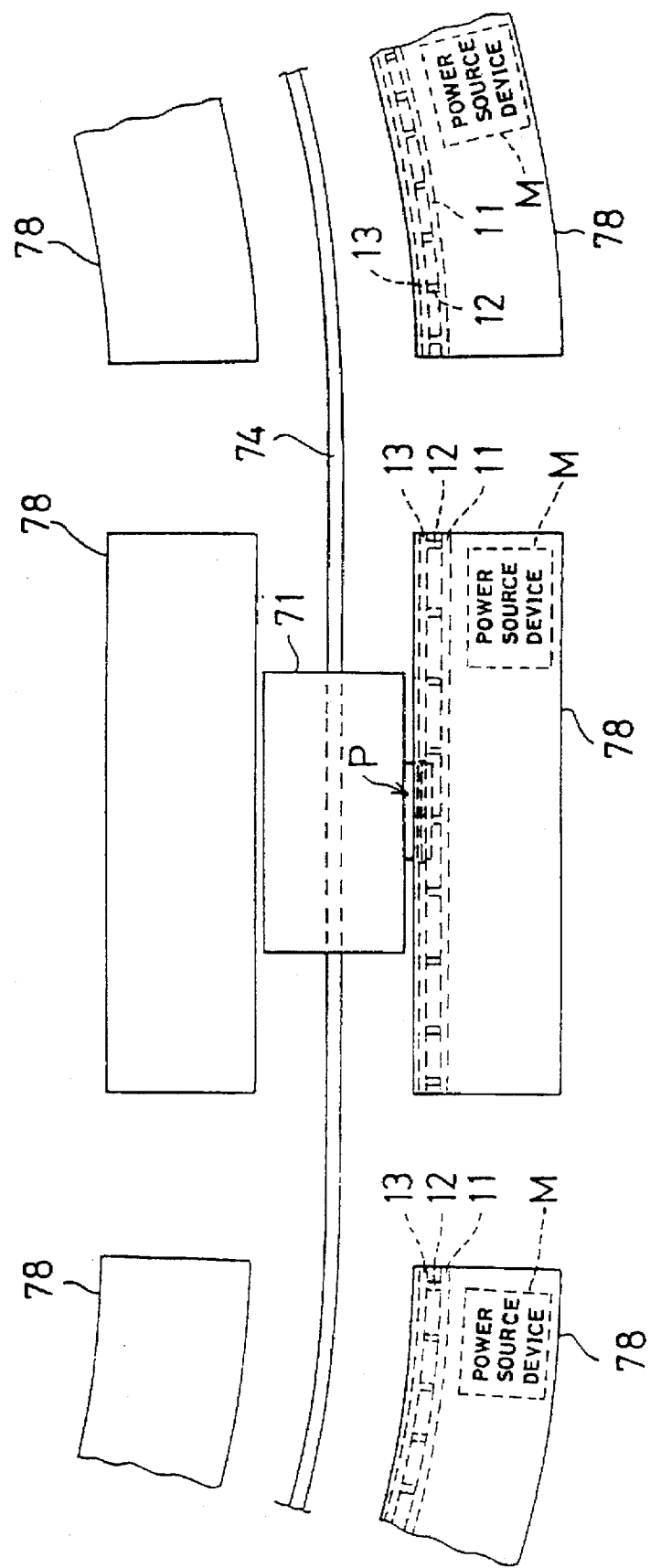
FIG. 12 is a plan view of the portion shown in FIG. 11.

A third embodiment of the present invention will now be described with reference to FIGS. 8 and 9. In this third embodiment, the same members as used in the first and second embodiments shown in FIGS. 1 through 7 will be denoted by the same reference characters to omit a detailed description thereof. The numeral 61 denotes a carriage serving as a moving body, having a lifter 63 for supporting and lifting and lowering the body of a vehicle such as an automobile. A plurality of such vehicle bodies 61 are trained together and moved on rails 64 corresponding to the transport passage. Thus, the vehicle body 62 is transported and lifted and lowered, whereby the assembling operation of the vehicle body is carried out.

As in the embodiment shown in FIG. 7, a bracket 11 is installed along the rails 64 through a support member 9 with the concave portion 11A of said bracket directed upward. The pick-up unit P is attached to the lower surface of the carriage 61 in such a manner that the center of the ferrite core 15 of said pick-up coil P is disposed approximately intermediate between the pair of ducts 13 for the induction wire 14 and perpendicular to the bracket 11. Further, the power supplying unit 21 uses as its power source the electromotive force produced by the pick-up coil 16. This power receiving unit 21 supplies power to the lifter 63 which corresponds to a device to receive power. The numeral 65 denotes wheels and 66 denotes a signal line from which an instruction signal to lift or lower the lifter 63 is transmitted to the power receiving unit 21 through a contactor 67.

With the above arrangement, as in the preceding embodiments, power is contactlessly supplied to the carriage 61 and the same effects can be attained as in the preceding embodiments.

In each of the above embodiments, the induction wire 14 in loop form is arranged to lay a pair of induction wires which differ in the direction of current flowing therethrough; however, if such pair of induction wires cannot be laid, one induction wire alone may be laid in the bracket 11, while the other may be extended through a different passage; thus, said one induction wire alone is positioned adjacent the pick-up coil 16. In such case, it goes without saying that power is decreased. Further, in each of the above embodiments, a single induction wire is laid in a single duct 13; however, two or more induction wires may be laid in a single duct 13 to increase power.

FIGS. 10 through 13 show a fourth embodiment of the present invention. The numeral 71 denotes a traveling body serving as a moving body, in the form of a self-traveling transport carriage having traveling wheels 72 at four corners and adapted to automatically travel on a floor surface 73. This traveling body 71 is provided on its upper surface with a load receiving section 75 to have a load placed thereon. As shown in the circuit diagram in FIG. 13, the traveling body 71 is internally provided with a battery 76 and a motor 77 using said battery as its power source, said motor 77 driving the traveling wheels 72 for the traveling body 71 to travel.

A plurality of work stands 78 serving as work stations are installed along a guide path 74 for guiding the traveling body 71. The lateral surface of each work stand 78 adjacent the guide path 74 is provided with a bracket 11 having hangers 12 carrying ducts 13 of resin at their front ends with an induction wire 14 laid therein. The lateral surface of the traveling body 71 opposed to the work stations 78 having the induction wire 14 is provided with a pick-up unit P.

Figure 13:
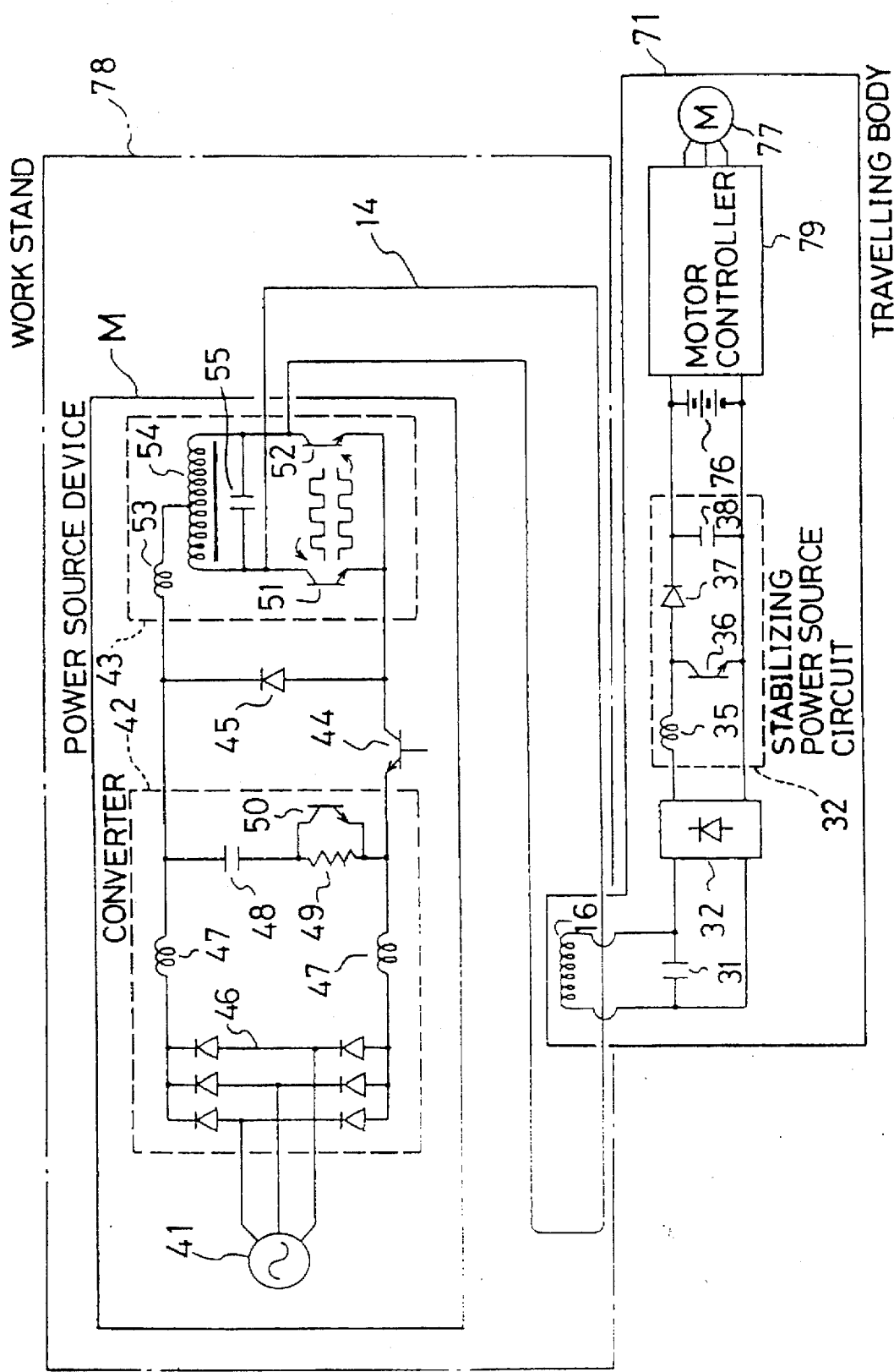
FIG. 13 is a circuit diagram of the device shown in FIGS. 10 through 12.

The detailed circuit arrangement of the power source device M and the power supplying device for the traveling body 71 is shown in FIG. 13. In this circuit, the output side of the stabilizing power source circuit 33 in the traveling body 71 differs from the circuit shown in FIG. 4. More particularly, a battery 76 is connected to the stabilizing power source circuit 33 and a speed-reducer-equipped motor 77 for driving the traveling wheels 72 is connected to said battery 76 through a motor controller 79.

According to such arrangement, the motor controller 79 using the battery 76 as its driving source drives the motor 77 for driving the traveling wheels 72, whereby the traveling body 71 travels on the floor surface 73 as it is guided by the guide path 74. When the traveling body approaches the work stand 78, the magnetic flux produced in the induction wire 14 produces an electromotive force in the pick-up coil 16 of the traveling body 71 which resonates at the frequency of the current flowing through the induction wire 14. The ac current produced by this electromotive force is rectified by the diode 32 and the voltage is adjusted to a predetermined value by the stabilizing power source circuit 33, whereby the battery 76 is charged. Current is supplied to the motor 77 through the motor controller 79. The traveling wheels 72 are driven by the thus energized motor 77, whereby the traveling body 71 is moved as it is guided by the guide path 74.

Normally, the speed of the traveling body is reduced when the traveling body reaches the work stands 78, so that the battery is charged for a long time to a sufficient degree.

In this manner, the traveling body 71 is contactlessly supplied with power as it moves by the work stands 78 to charge the battery; therefore, there is no need for the traveling body 71 to once leave the transport passage to enter a charging station, making it possible to increase the operating efficiency to a great extent. There is no possibility of the pick-up coil 16 to contact the induction wire 14 even at a curved region and the traveling body 71 can smoothly move along such curved region.

Figure 14:
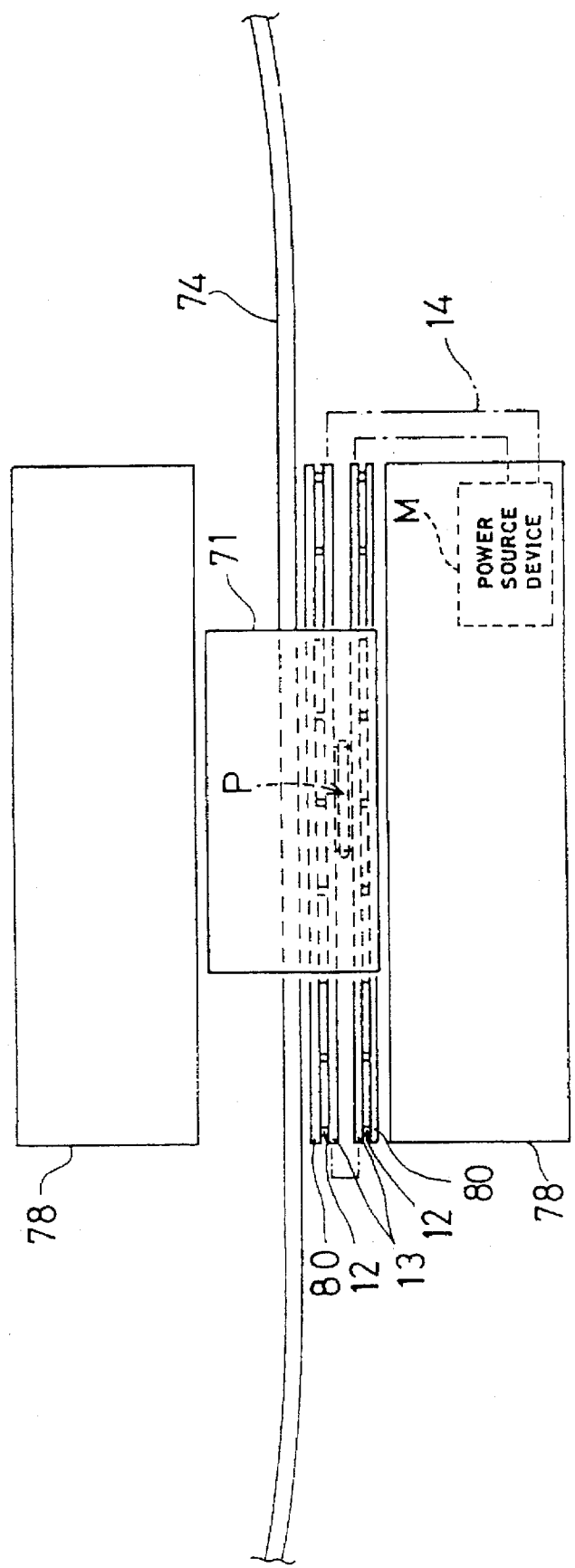
FIG. 14 is a plan view of the position of a moving station in a fifth embodiment of the invention.
Figure 15:
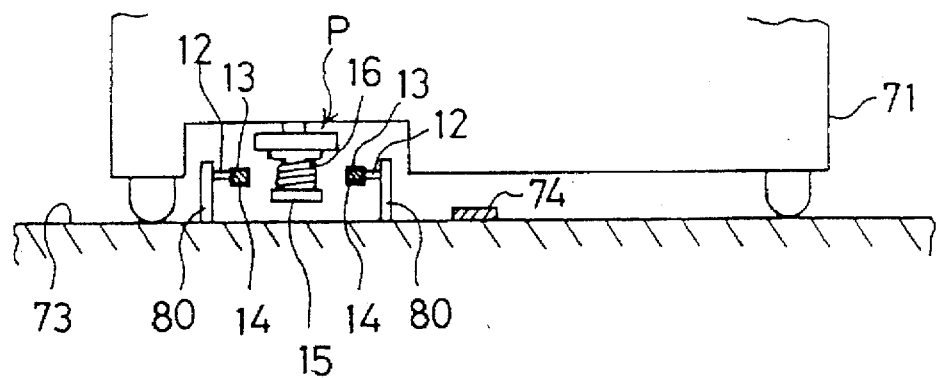
FIG. 15 is a front view of the portion shown in FIG. 14.

In the fourth embodiment described above, the induction wire 14 is installed on the lateral surface of the work stand 78. However, in a fifth embodiment shown in FIGS. 14 and 15, a pair of support members 80 are installed on the portion of the floor surface 73 where a work stand 78 is installed and along the guide path 74, and hangers 12 project from the inner surfaces of the support members 80 to carry the induction wire 14 at the front ends.

Figure 16:
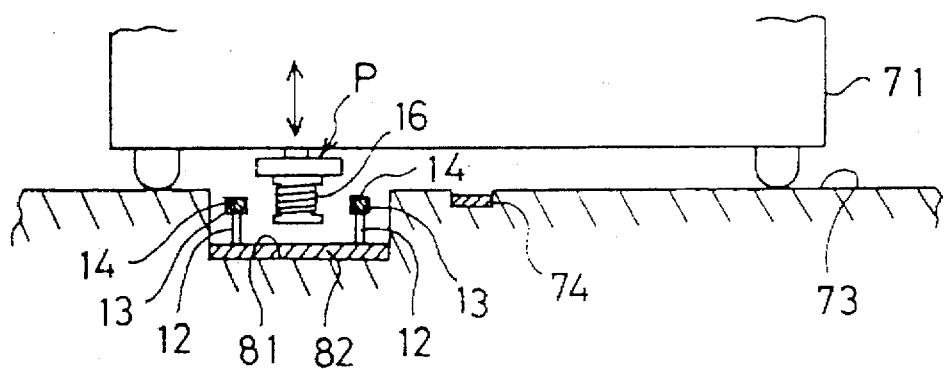

Further, as shown in a sixth embodiment in FIG. 16, in the range of the width of the traveling body 71 on the portion of the floor surface 73 where a work stand 78 is installed, a groove 81 is formed along the guide path 74, and a bracket 82 having hangers 12 vertically projecting therefrom, with ducts 13 installed at the front ends of said hangers and an induction wire 14 laid in the ducts 13. In this case, the pick-up unit P is of liftable type so that it is lowered at the position where the groove is formed and before the groove 81 terminates as it is traveling, it is lifted from the groove 81 and received in the traveling body 71.

What is claimed is:

1. A transport system comprising:

a magnetic field shielding member having a C-shaped cross-section, which has a concave portion formed therein and is disposed along a transport passage guiding a moving body, said moving body being arranged in a non-guiding relationship with said shielding member;

an induction wire laid out in said concave portion of the magnetic field shielding member and a power source supplying said induction wire with a high frequency sine wave current;

a coil disposed in said moving body and caused to produce an electromotive force by a magnetic flux of said induction wire, said coil extending into said concave portion;

a capacitor disposed in said moving body and cooperating with said coil to form a resonance circuit which resonates at the frequency of a current flowing through said induction wire; and a power source circuit provided in said moving body and connected to said resonance circuit so as to supply power to a power receiving device provided on said moving body.

2. A transport system as set forth in claim 1, wherein the induction wire is in the form of a loop with its initial and terminal ends connected to a power source and is so arranged in the concave portion of the magnetic field shielding member as to be in the form of a pair of wires differing from each other in the direction of current flow, and the coil is positioned substantially in the middle between said pair of wires in said concave portion.

3. A transport system as set forth in claim 1, wherein a switch and the power source circuit are connected in parallel with the coil of the moving body.

4. A transport system as set forth in claim 1, wherein the induction wire and the coil are each in the form of a twisted wire composed of thin insulated strands.

5. A transport system as set forth in claim 1 or 2 wherein the moving body is a pallet, and the magnetic field shielding member is suspended toward said pallet with its concave portion directed downward and the coil is positioned on the upper surface of said pallet opposed to said magnetic field shielding member.

6. A transport system as set forth in claim 1 or 2, wherein the moving body is a pallet, and the magnetic field shielding member is suspended toward said pallet with its concave portion directed upward and the coil is positioned on the lower surface of said pallet opposed to said magnetic field shielding member.

7. A transport system as set forth in claim 1 or 2, wherein the magnetic field shielding member is positioned toward the moving body with its concave portion directed horizontally, and the coil is positioned on a lateral surface of said moving body opposed to said magnetic field shielding member.

8. A transport system as set forth in claim 1, wherein the moving body is a carriage and the power-receiving device is a lifter mounted on said carriage, said lifter being capable of lifting and lowering while supporting the body of a vehicle transported by said carriage.

9. A transport system as set forth in claim 1, further comprising a self-propelled traveling body as the moving body, a battery mounted on said traveling body as the power-receiving device, and a charging circuit to said battery as the power source circuit, wherein the traveling body is provided with a motor for traveling itself by employing the battery as its drive power source;

a single or a plurality of work stations each having a work stand are disposed on the transport passage of the traveling body;

the induction wire is laid out along a lateral surface of each said work stand; and the coil is positioned to a lateral surface of said work stand opposed to said lateral surface laid out with said induction wire.

10. A transport system as set forth in claim 9, wherein the traveling body travels at a lower speed in each said work station than outside each said work station.

* * * * *